Patented Jan. 25, 1944

2,339,945

UNITED STATES PATENT OFFICE 2,339,945

RUBBER CHLORIDE MANUFACTURE

James Wallace Raynolds, Pittsburgh, Pa., assignor to The Raolin Corporation, Charleston, W. Va., a corporation of West Virginia No Drawing. Application December 12, 1938, Serial No. 245,293

12 Claims. (Cl. 260—772)

This invention relates to rubber chloride manufacture; and it comprises rubber chloride of such high purity that in films free from stabilizers or plasticizers it resists the action of relatively high temperatures, and also resists various solutions and reagents at high temperatures; and it comprises a process of making rubber chloride of high purity, wherein a substantially anhydrous rubber solution is prepared having a nitrogen content not exceeding 0.2 per cent, and advantageously less than 0.1 per cent, on the rubber, and wherein the pure anhydrous rubber in solution is chlorinated, advantageously to a minimum chlorine content of about 65 per cent, and wherein the resulting solution of substantially pure chlorinated rubber is freed from acid and treated with a dry adsorbent which removes haze-forming nitrogenous impurities therefrom, and wherein pure rubber chloride having a nitrogen content not exceeding 0.02 per cent, and advantageously less than 0.01 per cent, is recovered from the solution; and it comprises a cyclic method of practicing the said process, wherein the rubber is dissolved and chlorinated in a chlorine-resistant organic solvent from which the rubber chloride is obtained by precipitation, advantageously with an alcohol, followed by recovery of the solvent and alcohol for reuse in the process; all as more fully hereinafter set forth and as claimed.

It has long been known that rubber reacts with chlorine to form a rather extensive series of products which are known generically as rubber chlorides or chlorinated rubbers. It is thought that the chlorine goes into the rubber chloride molecule partly by addition at the double bonds of the caoutchouc (or polyprene) and partly by substitution for hydrogen atoms in the original molecule. Typical of the better products of chlorination are substances which are believed to have the formulas $C_{10}H_{13}Cl_7$ and $C_{10}H_{12}Cl_8$. The first of these, rubber heptachloride, is believed to contain four added chlorine atoms and three substituted chlorine atoms to the molecule. It contains 65.1 per cent chlorine by weight. The octachloride has four added and four substituted chlorine atoms and contains 68.2 per cent chlorine by weight. Even higher chlorine contents are attainable. Compounds of this nature, and especially the heptachloride, are much more stable than rubber chlorides with lower chlorine contents.

For sometime it has been proposed to employ rubber chlorides in making lacquers and varnishes and other plastics. The properties of rubber chloride are unique, since it is substantially non-inflammable, and in pure form it is stable against deterioration, even at fairly elevated temperatures. Also, it is so inert chemically that it is wholly unaffected by most liquids, including aqueous solutions of acids, alkalis and salts, as well as alcohols and many other organic solvents. One important property is its indifference to aliphatic hydrocarbons, including petroleum solvents.

These unique properties of rubber chloride offer many possibilities of utilization, and numerous applications have been suggested. Also, several processes have been proposed for preparing rubber chloride, and for purifying it and stabilizing it. So far as I am aware, however, no process has been proposed heretofore which would produce, in commercial operation, a uniform product of sufficient purity and stability to be satisfactory for the more difficult applications which have been proposed. Also, while some of the methods proposed for preparing and purifying rubber chloride may be technically successful on a laboratory scale, they are not suited for commercial operation. An object achieved by my invention is to provide a process of preparing rubber chloride of high purity which is operable on a commercial scale and with considerable economy as compared with prior processes. Another object achieved by my invention is to provide a commercial process for the manufacture of a rubber chloride more pure and stable than that heretofore available. A further object achieved by my invention is to provide rubber chloride which is so pure and stable that it is useful without substantial modification as a material for coatings and plastics employed under very severe service conditions.

The process by which I prepare my improved rubber chloride consists essentially of a cement making step, a chlorinating step, a purifying step and a precipitating step; and certain other steps and modifications are advantageously included, especially in commercial operations, as will be apparent from the following description.

As indicated, the first step in my process is the preparation of a rubber cement or rubber solution, which is subsequently chlorinated. It has been sometimes proposed heretofore to chlorinate rubber in the dry state, but this is not satisfactory for several reasons. It is simpler and more economical to obtain a uniform and highly chlorinated product when chlorination is performed with the rubber dissolved or dispersed in a suitable chlorine-resistant solvent. It is also advantageous, when chlorinating rubber in solution, to have the solution at a minimum viscosity and as nearly anhydrous as possible. In addition to the low viscosity and freedom from water of the solution, the rubber to be chlorinated must be very free from impurities, if the ultimate product is to have the desired purity and stability. I therefore consider it essential to produce, in my cement making step, an anhydrous rubber cement or solution containing not more than 0.2 per cent, and usually not more than 0.1 per cent, of nitrogen, calculated on the rubber.

A cement meeting this specification may be prepared by first dissolving previously purified or deproteinized rubber, which is now available on the market, in a suitable solvent. The solvent should be chlorine-resistant, and carbon tetrachloride is suitable. Dispersion of the rubber in the solvent, and dehydration and reduction in viscosity of the cement or solution, are then advantageously effected by the process disclosed in a copending application, Serial No. 62,547 (Patent No. 2,148,830) which is discussed more fully hereinbelow. As an alternative, I may prepare a solution of good crepe rubber or smoked sheet rubber in a suitable solvent and then treat the solution to dehydrate it and reduce its viscosity, in accordance with the aforesaid process, for example, after which the solution is purified to reduce or eliminate the nitrogenous impurities as described in my application, Serial No. 200,536, for example. Other methods of preparing rubber cements of sufficient purity may also be employed.

Clean pale crepe rubber contains, as impurities in the caoutchouc, certain water soluble and hygroscopic matters coming from the latex. This impurity is often called "proteid," but it includes various carbohydrates and other non-nitrogenous substances, as well as mineral matter, in addition to the actual nitrogen-containing substances. All of these impurities are generally found in a more or less hydrated state in the rubber. In a good grade of crepe rubber, the amount of this foreign or non-rubber matter may be around three or four per cent on a dry basis; and in the usual hydrated condition, the proportion is higher. In addition to these impurities, rubber ordinarily contains resins, sugars, etc., which are removable by extraction. A typical analysis of a good grade of pale crepe rubber is

| | Per cent |
|---|---|
| Ash | 0.3 |
| Resin (acetone extract) | 3.2 |
| Water extract | 0.3 |
| Sugars | 0.3 |
| Protein | 2.94 |
| Caoutchouc | Balance |

These non-rubber substances are important in that their presence to a large extent controls the physical properties of uncured rubber. They are presumably distributed in the rubber as gelatinous films or in some net-work arrangement. The assumption is that the rubber occurs as bounded phases with intervening proteid matter. This foreign matter is hygroscopic, and rubber containing it is not water-proof.

For most applications of rubber, this interiorly incorporated non-rubber component is not objectionable, and it may, in fact, be desirable. There are, however, certain uses of rubber in which the normal physical structure including the presence of these impurities is undesirable. This is especially true with respect to the manufacture of rubber chloride, in which high purity is desirable. Rubber chloride which is free from the non-rubber substances normally associated with caoutchouc can carry 65 per cent or more chlorine, and is an extremely permanent and resistant material. However, its stability and resistance to heat bear a direct relationship to its freedom from proteid matters, resins and other normal impurities of rubber. During chlorination of the rubber, the non-rubber impurities, if present, are also chlorinated more or less; and to the extent that they are present, whether chlorinated or not, they contribute an element of instability to the rubber chloride. Also, and this is often more serious in practice, they furnish spots or specks of hygroscopic material throughout the rubber chloride. It then cannot form wholly water-proof varnish films and plastics.

It has been heretofore proposed to eliminate the non-rubber impurities in rubber by various procedures. One of these procedures involves the treatment (creaming) of latex with proteolytic enzymes, such as pancreatin and the like. This is one method of producing the deproteinized rubbers of commerce, which are distinctly better than the original rubber from the standpoint of the impurities which they contain. A typical analysis of deproteinized rubber shows about 0.1 per cent ash, 0.12 per cent water extract, 1.2 per cent of resins (acetone extract), and about 0.5 to 0.8 per cent of "proteid." Protein content is generally calculated as 6.25 times nitrogen content; and the deproteinized rubbers under consideration thus have nitrogen contents of about 0.08 to 0.15 per cent or more on the caoutchouc. Such products, and especially the deproteinized rubbers containing less than 0.1 per cent nitrogen, are well suited for use in the production of pure rubber chloride in accordance with my present invention.

In making the rubber cement or rubber solution from this deproteinized rubber, it is cut into strips or pieces of suitable size and charged into a container of solvent. This container is advantageously a closed kettle equipped with an agitator and a heater, such as a steam jacket, and connected with a reflux condenser open to the atmosphere. A chlorine-resistant solvent, such as carbon tetrachloride, is advantageously employed in the original cement making step, as the cement can then be chlorinated directly. Enough solvent should be employed so that the concentration of the solution is only a few per cent; advantageously 2 or 3 per cent, and not exceeding about 5 per cent. For example, I may use fifteen pounds of deproteinized rubber and fifty gallons of carbon tetrachloride.

After the rubber is added, the carbon tetrachloride is gradually heated, with agitation; for example, in about three hours the temperature is brought up to about 76° C. (the boiling point or reflux temperature) and the rubber goes into solution. The solution is kept boiling under the reflux for several hours, about four or five hours being usually satisfactory. During this time, or a longer period if necessary, the solution or dispersion of rubber approaches a minimum viscosity, due to disaggregation of the rubber miscelles. Also, any water present in the system is eliminated by azeotropic distillation and passes out through the condenser. Both the disaggregation and the dehydration are important, and heating under the reflux should be continued until these results are obtained. Disaggregation may be expedited by the presence of copper during the heating under reflux, as described and claimed in a copending application, Serial No. 296,849, filed September 27, 1939.

When the rubber solution or cement is dehydrated and at minimum viscosity, it is advantageous to raise the temperature for a brief period, such as one-half hour, sufficiently to distill over a little of the solvent. Usually from 1 to 5 per cent is distilled off and condensed elsewhere—one or two gallons from a fifty gallon batch, for example. This distillation eliminates any water or water-vapor which may have accumulated in the top of the reflux condenser. The water eliminated from the cement is usually 3 to 10 grams per pound of rubber when using pale crepe rubber, but is usually somewhat less when using deproteinized rubber.

After the distillation, the cement is advantageously withdrawn from the cement kettle and delivered to a separate chlorinating vessel, but it may be chlorinated in the cement-making vessel. It is important to have the cement at this stage anhydrous, and containing not much more than 0.1 per cent nitrogen on the rubber. It is advantageous to have the nitrogen content at this point as low as possible.

Instead of disaggregating and dehydrating a solution of deproteinized rubber as just described, I sometimes start with good pale crepe rubber or smoked sheet and subject it to a similar thermal treatment to effect solution, disaggregation, and dehydration. When using pale crepe rubber, it is advantageous to mill it somewhat before the cement making treatment, as disclosed in the aforesaid application, Serial No. 62,547 (Patent No. 2,148,830). After the dehydrated solution of minimum viscosity is obtained, I then purify it by the process described in my application, Serial No. 200,536. In this process, a small amount of a dry adsorbent, such as "Eponite" or other suitable active carbon, is added to the boiled rubber solution or cement, and heating is continued for a short time, advantageously with mild agitation. An addition of about 1 per cent "Eponite," on the rubber, followed by heating and agitating for 30 to 60 minutes, generally produces the desired result. The carbon collects the desiccated non-rubber constituents of the rubber which are present in the cement, and is then removed from the solution along with the collected impurities. This is most advantageously accomplished by adding a small amount of coarser adsorbent, such as a diatomaceous earth filter-aid, and filtering to give a bright, clear solution substantially free of non-rubber constitutents. In this manner, it is possible to produce a cement containing approximately 0.1 per cent nitrogen on the rubber, which is also anhydrous, and at minimum viscosity.

When a cement having the specified characteristics has been prepared by either of the above methods, or by any other suitable method, it is ordinarily allowed to cool to a temperature below 40° C. before starting chlorination. It is advantageous to employ a glass lined chlorinating vessel, although other suitable structural materials may be employed. The vessel is provided with one or more suitable inlets for discharging chlorine gas into the solution, advantageously near the bottom of the vessel. It is also advantageously provided with a circulating system for withdrawing solution from the bottom of the vessel and returning it to the top during chlorination. This tends to draw the chlorine into the solution, and to increase the rate of reaction with the rubber. The circulating pipe advantageously includes a length of glass or quartz tubing, through which the solution is irradiated with a mercury vapor lamp, for example, during recirculation. This facilitates chlorination to the desired high chlorine content, and reduced the time necessary for chlorination. It is adantageous to have the circulating system, or the gas inlet pipe, or some other part of the system made of copper, as this also expedites chlorination, as described in more detail and claimed in my copending application, Serial No. 276,130, filed May 27, 1939.

When chlorination of the rubber cement or solution is started, advantageously with circulation and irradiation as above described, the chlorine is introduced quite rapidly; for example, about 95 per cent of the theoretical chlorine requirement for making the heptachloride is introduced during a three hour period. The heat of reaction raises the temperature of the solution to about 70° C. during this period. The rate of chlorine introduction is then advantageously decreased while the solution is recirculated to allow for further reaction. Sufficient chlorine to complete the theoretical requirement, with an excess of say 10 per cent, may be introduced at a slower rate during this period, if desired, and after a sufficient period the desired chlorination is effected.

As a modification of this procedure which gives better results, I sometimes discontinue the flow of chlorine after about 95 per cent of the theoretical requirement has been added, and recirculate the solution for about an hour at this stage to permit reaction of all of the introduced chlorine. Dry air at a low pressure, such as two pounds per square inch, is then blown through the solution for a short time—thirty minutes, for example—to remove HCl gas which has been formed by the substitution reaction and which tends to inhibit the final stages of chlorination. This air must be dry to prevent undesirable additional acid formation and other disadvantageous results. During the blowing with air, the temperature of the solution falls off slightly, but generally not below 60° C. The air-blowing is then discontinued, and chlorine is again introduced at a slow rate for about two hours, at which time a total of about 10 per cent of chlorine in excess of the theoretical requirements has been introduced. The solution is then recirculated for about one-half hour to an hour more to permit further reaction, after which the rubber in solution is generally chlorinated to a rubber chloride containing a minimum of 65 per cent chlorine. It is essential to the stability of the final product that the chlorine content of the dissolved product at this stage be not substantially less than 65 per cent; and it is advantageously about 66 per cent or more.

Regardless of whether the above-described intermediate air-blow to eliminate HCl is employed, it is necessary at the end of the chlorinating reaction to eliminate HCl and excess chlorine. This may be partially accomplished by heating the solution to the reflux temperature for an hour or two, after which the remaining acid in the solution is sometimes neutralized by adding finely divided lime or some other suitable alkaline reagent, as disclosed in the above-mentioned application, Serial No. 62,547 (Patent No. 2,148,830). When working with anhydrous cements, however, I find it possible, and much more convenient, to eliminate the acidity from the reaction mixture by a final air-blow with dry air, advantageously at a slightly higher rate than that specified above for the intermediate treatment. Dry air supplied through the chlorine inlets at five pounds pressure for about thirty minutes to one hour is usually sufficient to reduce the acidity to less than 0.03 per cent, calculated as HCl. One or more samples are ordinarily withdrawn and titrated with N/10 NaOH to determine the acidity before the chlorinated rubber solution is withdrawn from the chlorinator.

Chlorine and HCl evolved during the intermediate or final air-blow, and at other times during chlorination, are recovered in known manner, thus preventing waste and air pollution. The operations involved in the intermediate and final air blowing are more fully described and claimed in a copending application, Serial No. 260,217, filed March 6, 1939.

The substantially acid-free solution of rubber chloride containing at least 65 per cent chlorine, produced as above-described, is then subjected to purification to further reduce the nitrogen content. This treatment is advantageously effected by suitable application of a dry active adsorbent carbon, such as finely ground "Eponite," as described in my copending application Serial No. 69,415 (Patent No. 2,148,832). During this treatment the pot temperature is held at about 50° C. while an amount of "Eponite" on the order of 1 per cent on the rubber (about 0.3 per cent on the rubber chloride) is added, and the mixture is gently agitated for about thirty minutes. Larger quantities of "Eponite" may be added, but are generally unnecessary. After the agitation, a somewhat larger amount of dry filter-aid is usually added to the solution and agitated with it for a short period, such as five minutes. This filter-aid may be "Filter-cel" or "Hyflo" or some other diatomaceous earth filter-aid, which is quite finely divided, but still somewhat coarser than the "Eponite." The quantities of these materials may be varied, but satisfactory results are obtained when using about 1 per cent of "Eponite," on the rubber, and about 10 per cent "Hyflo." The adsorbents and the impurities collected thereby (non-rubber constituents, more or less chlorinated) are then removed from the rubber chloride solution, advantageously by filtering through a pre-coated filter press. The purification of rubber solutions before and after chlorination is described in my copending application, Serial No. 116,649, filed December 18, 1936.

The filtered liquor obtained from the purification step is usually discharged to a reservoir for storage pending further treatment. When the cement-making, chlorinating, and purifying steps are properly performed in accordance with my invention, this filtered liquor has an acidity of less than 0.003 per cent and is free from haze, having a nitrogen content less than 0.02 per cent and generally not exceeding 0.01 per cent on the rubber chloride. Nitrogen contents considerably lower than this are often obtained.

The pure clear rubber chloride solution is withdrawn from the reservoir as required, for recovery of the rubber chloride. Recovery may be effected in any convenient manner, but I find it most advantageous to precipitate the rubber chloride by adding a non-solvent to the solution. This non-solvent may be water or a petroleum fraction such as kerosene, but I find that the cleanest and most easily controlled precipitation is effected with an alcohol such as methanol. The selected precipitant, such as methanol, may be combined with the rubber chloride solution in any desired manner. I find it especially satisfactory, however, to simultaneously deliver the purified solution of rubber chloride in carbon tetrachloride and the methanol to opposite points in the top of a special colloid mill in which precipitation occurs, as described in more detail and claimed in my copending application, Serial No. 287,641, filed July 31, 1939.

In this method of precipitation, both streams of liquid are so controlled that the rubber chloride is completely precipitated; and the density of the product is controlled within certain limits by variation of the ratio of methanol to solution. The precipitate formed is pulverized or granulated in the mill during or after its formation, and it is discharged in finely divided form, as a slurry or thin pulp, dispersed in the mixture of alcohol and solvent. The rubber chloride is then separated from most of the liquid, in a filter press or centrifugal for example; and the recovered solids are charged into a vacuum drier where the remaining solvent and alcohol are removed, advantageously under a relatively high vacuum, such as 26 inches Hg. The dry solids obtained after vacuum drying is a uniform powder; a much more convenient and useful form than the coarser precipitates heretofore generally obtained.

The liquids separated from the powdered rubber chloride in the filter press or centrifugal and in the vacuum drier are collected in suitable extraction tanks, which are advantageously made of wood or of glass-lined steel. It is generally desirable not to employ metal tanks for this purpose, as the mixture of methanol and carbon tetrachloride is quite corrosive, especially in the presence of moisture. A volume of water at least equal to the volume of methanol present is added to the tanks of mixed solvent, and the whole mixture is agitated for some twenty or thirty minutes. The mixture is then allowed to settle for say twenty-four hours, during which it separates into a supernatant water-alcohol layer and a lower layer consisting principally of carbon tetrachloride. This lower layer typically has a specific gravity of about 1.575 at 29° C., and after withdrawal it is distilled to obtain good carbon tetrachloride, which is returned to the cement-making stage previously described.

The upper layer consists principally of alcohol and water, and usually has a specific gravity between .93 and .96. It is withdrawn from the separating tanks and fed to a methanol fractionating still. The methanol recovered from this still is returned to the precipitating stage previously described; and this recovered methanol is actually better than fresh commercial methanol, in that its iron content is reduced. With moderately careful operation, it is possible to recover at least 98 per cent of all of the methanol and carbon tetrachloride employed in the process.

The product obtained by this process has exceptional properties due largely to its high purity. The rubber in the cement which is chlorinated contains less than 0.2 per cent of nitrogen, and advantageously less than 0.1 per cent; and the final product contains less than 0.02 per cent nitrogen, and less than 0.01 per cent under favorable conditions. In addition, most of the sugars and other non-rubber constituents are eliminated by the "Eponite" treatment after chlorination, and any remaining resinous constituents are removed during the alcohol precipitation. The resulting product is essentially pure chlorinated isoprene or chlorinated caoutchouc; and is certainly the closest approximation to the pure chlorinated compounds which has been commercially available up to the present.

Because of its chemically pure nature, my product has unique properties. For example, it will withstand heating to temperatures of the order of 300° F. and higher, in the form of thin films on metal surfaces, without decomposition. This stability is a characteristic of my new product, and eliminates the necessity for the addition of stabilizers, which have been usually employed with rubber chlorides heretofore available. The absence of stabilizers is in itself advantageous, since the stabilizers are, in effect, impurities in the rubber chloride which in use reduce its resistance to aqueous solutions and other reagents. Thus, films of my pure rubber chloride free from stabilizers will withstand heating for more than an hour at 212° F. in contact with an alcohol solution without developing "blush" or discoloration, whereas less pure rubber chlorides, when similarly exposed, develop a decided blush at lower temperatures and in shorter periods. Rubber chlorides available prior to my invention characteristically contained at least about 0.1 per cent nitrogen.

Furthermore, my pure, substantially nitrogen-free product may be used without plasticizers for many applications, such as the lining of cans previously given a base coat of the usual oleoresinous varnish. The addition of plasticizers, as disclosed in my application, Serial No. 69,416, for example, and of petronizing agents as disclosed in my application, Serial No. 69,414, is sometimes advantageous for special applications; but it is generally desirable, in applications of rubber chloride for severe service conditions, to apply a film of rubber chloride free from both stabilizers and plasticizers. My new product is suitable for such applications and is, I believe, the first rubber chloride preparation to be suitable for such applications. When modifying ingredients are employed, they should be so selected as to have a minimum effect on the desirable properties of the rubber chloride film.

As an example of the preparation and application of rubber chloride in accordance with my invention, rubber cement was prepared from commercial deproteinized rubber containing less than 0.1 per cent nitrogen by heating a carbon tetrachloride solution containing 3 per cent of this rubber, under reflux, for about four hours, to dehydrate it and reduce its viscosity as described hereinabove. This cement was chlorinated, the rubber chloride solution was purified with "Eponite" after air-blowing to remove HCl, and the rubber chloride was precipitated in a colloid mill and dried, all in accordance with my process as previously described. The recovered rubber chloride was a finely divided clear white powder containing 65.5 per cent chlorine and 0.0085 per cent nitrogen, and was free from acidity. This rubber chloride was dissolved in a solvent mixture of methyl ethyl ketone and butyl acetate to form a varnish, which was applied to preformed canned bodies over a well-known base coat of oleo-resinous varnish, and the cans coated with rubber chloride were then baked for eighteen minutes at 290° F. The resulting film of rubber chloride was very thin, weighing approximately 5 milligrams per square inch. The coated cans were filled with an aqueous solution containing 5 per cent ethyl alcohol, closed, and subjected to heating at different temperatures for varying lengths of time. The cans coated as described withstood heating for sixty minutes at 212° F. with no "blush" whatever; but cans similarly coated with other rubber chlorides in some instances developed "blush" at temperatures as low as 180° F., and substantially all turned white and developed noticeable "blush" at 212° F. in a few minutes.

This test is severe, but it clearly indicates that films of rubber chloride prepared in accordance with my invention are suitable for lining cans containing fruit juices, for example, which must be pasteurized at 212° F. Rubber chlorides previously available are not satisfactory for such purposes. It has been demonstrated that my rubber chloride, which passes this test, is suitable for many coating applications in which no previously available rubber chloride could be satisfactorily employed; and in which, in some instances, no previously known organic coating of any kind was considered suitable.

As previously stated, I consider that the reason for the ability of my new rubber chloride product to withstand severe service conditions is its exceptional purity and freedom from nitrogenous matter, as well as resins, sugars, etc. In the example given, the final rubber chloride contained only 0.0085 per cent nitrogen, and this exceptional purity is not difficult to obtain commercially with reasonably careful operation in accordance with my invention. As stated, final products which are most satisfactory contain less than 0.02 per cent, and advantageously less than 0.01 per cent nitrogen on the rubber chloride. This purity with respect to nitrogenous matter, coupled with stability and freedom from sugars, resins, acid and other hygroscopic materials, are characteristic of the products obtained by my process, wherein the rubber cement to be chlorinated is anhydrous and contains less than 0.2 per cent nitrogen on the rubber; wherein the rubber in this cement is chlorinated to a minimum chlorine content of about 65 per cent; and wherein the so chlorinated rubber is then treated to eliminate acidity and reduce the nitrogen content to a maximum of 0.01 to 0.02 per cent, after which the rubber chloride is advantageously precipitated with alcohol. My product and my process for obtaining it are both important contributions to the art.

This application is a continuation-in-part of my applications Serial No. 69,415, filed March 17, 1936, Serial No. 116,649, filed December 18, 1936, and Serial No. 200,536, filed April 6, 1938.

What I claim is:

1. The method of making rubber chloride, which comprises preparing an anhydrous rubber cement containing not substantially more than 0.2 per cent nitrogen on the rubber, chlorinating the rubber cement to form a solution of rubber chloride having a minimum chlorine content of about 65 per cent on the rubber chloride, purifying the rubber chloride solution to reduce its nitrogen content to less than 0.02 per cent on the rubber chloride by adding to the solution a minor amount of finely divided dry non-reactive adsorbent material which collects nitrogenous impurities in the solution and separating the solution from the adsorbent and the impurities collected thereby, and recovering the rubber chloride from the solution.

2. The method of claim 1, wherein the rubber cement is prepared by heating deproteinized rubber containing less than 0.1 per cent nitrogen with a chlorine-resistant solvent therefor.

3. The method of claim 1, wherein the rubber cement is prepared by dissolving rubber in a chlorine-resistant solvent therefor, heating the resulting solution under reflux, and purifying the solution by contact with dry, finely divided, adsorbent material to reduce its nitrogen content to a maximum of about 0.1 per cent, on the rubber.

4. The method of claim 1, wherein the said rubber chloride solution is treated to reduce its acidity to a maximum of about 0.03 per cent, calculated as HCl, before said purifying thereof.

5. The method of claim 1, wherein the rubber chloride is recovered from the solution by adding methanol thereto to precipitate the rubber chloride and separating the precipitated rubber chloride from the methanol and solvent.

6. The method of making rubber chloride, which comprises preparing an anhydrous rubber cement containing rubber dispersed in carbon tetrachloride and containing not substantially more than 0.2 per cent nitrogen on the rubber, chlorinating the rubber cement to form a solution of rubber chloride having a minimum chlorine content of about 65 per cent on the rubber chloride, purifying the rubber chloride solution to reduce its nitrogen content to not substantially more than 0.02 per cent on the rubber chloride by adding to the solution a minor amount of finely divided dry non-reactive adsorbent material which collects nitrogenous impurities in the solution and separating the solution from the adsorbent and the impurities collected thereby, adding methanol to the solution to precipitate the rubber chloride, separating the precipitated pure rubber chloride from the methanol and carbon tetrachloride, and separately recovering the methanol and carbon tetrachloride.

7. The method of claim 6, wherein the carbon tetrachloride and methanol separated from the precipitated rubber chloride are mixed with a quantity of water at least equal to the quantity of methanol, agitated, and allowed to separate into two layers, and wherein the layers are separately withdrawn and distilled.

8. The method of making rubber chloride, which comprises heating a minor amount of deproteinized rubber containing less than 0.1 per cent nitrogen with a major amount of a chlorine-resistant solvent for the rubber to form a solution, boiling the solution under reflux to dehydrate the solution and reduce its viscosity, chlorinating the solution to convert the rubber therein into rubber chloride having a minimum chlorine content of 65 per cent, reducing the acidity of the solution to a maximum of 0.03 per cent calculated as HCl, adding to the solution a minor amount of finely divided, dry, non-reactive, adsorbent material which collects nitrogenous impurities in the solution, removing the adsorbent and the impurities collected thereby and obtaining a clear rubber chloride solution containing not more than 0.01 per cent nitrogen on the rubber chloride, and recovering rubber chloride from the solution by precipitation in finely divided form.

9. As a new product, rubber chloride substantially free from all impurities and containing at least 65 per cent chlorine and not more than 0.02 per cent nitrogen.

10. A coating composition consisting essentially of the rubber chloride of claim 9 dispersed in a solvent therefor to form a varnish, said varnish being characterized by the ability to form thin films which resist exposure to aqueous solutions at elevated temperatures and pressures without substantial deterioration.

11. The rubber chloride of claim 9 in the form of a thin film resistant to high temperatures and aqueous solutions.

12. As a new product, rubber chloride substantially free from all impurities and containing at least 65 per cent chlorine and not more than 0.01 per cent nitrogen, said rubber chloride being produced by the process of claim 1.

JAMES WALLACE RAYNOLDS.

Disclaimer 2,339,945.—*James Wallace Raynolds*, Pittsburgh, Pa. RUBBER CHLORIDE MANUFACTURE. Patent dated Jan. 25, 1944. Disclaimer filed May 9, 1952, by the assignee, *Hercules Powder Company*.

Hereby enters this disclaimer to claims 9, 10, and 11 of said patent.

[*Official Gazette June 3, 1952.*]